United States Patent
Perez-Blanco

(10) Patent No.: US 11,320,184 B2
(45) Date of Patent: May 3, 2022

(54) HVACR SYSTEM USING ENVIRONMENTALLY-FRIENDLY REFRIGERANT WITH PURGE

(71) Applicant: TRANE INTERNATIONAL INC., Davidson, NC (US)

(72) Inventor: Marcos Eric Perez-Blanco, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 171 days.

(21) Appl. No.: 16/588,670

(22) Filed: Sep. 30, 2019

(65) Prior Publication Data

US 2021/0095901 A1   Apr. 1, 2021

(51) Int. Cl.
*F25B 43/04*   (2006.01)
*F25B 13/00*   (2006.01)

(52) U.S. Cl.
CPC .......... *F25B 43/043* (2013.01); *F25B 13/00* (2013.01)

(58) Field of Classification Search
CPC .......... F25B 43/043; F25B 13/00; F25B 1/10; F25B 2400/13; F25B 2400/121; F25B 2600/0253; F25B 1/053; Y02B 30/70
See application file for complete search history.

(56) References Cited

U.S. PATENT DOCUMENTS

| 3,131,548 A * | 5/1964 | Chubb | F25B 43/043 62/150 |
| 3,145,544 A * | 8/1964 | Weller | F25B 43/043 62/195 |
| 9,987,568 B2 | 6/2018 | Stark et al. | |
| 2013/0283832 A1 | 10/2013 | Kujak et al. | |
| 2017/0122670 A1 | 5/2017 | Ahlbom | |
| 2019/0203992 A1 * | 7/2019 | Monteith | F25B 43/043 |

* cited by examiner

*Primary Examiner* — Larry L Furdge
(74) *Attorney, Agent, or Firm* — Hamre, Schumann, Mueller & Larson, P.C.

(57) ABSTRACT

A refrigeration system is disclosed. The refrigeration system includes a refrigeration circuit including a compressor, a condenser, an expansion valve, and an evaporator fluidly connected. A purge circuit is fluidly connected to the condenser. The purge circuit is configured to receive a purge stream from the condenser. The purge stream is a mixture including a refrigerant and non-condensables. The purge circuit includes a plurality of heat exchangers for condensing the purge stream such that the non-condensables and the refrigerant in the purge stream are separated.

20 Claims, 3 Drawing Sheets

HVACR SYSTEM USING ENVIRONMENTALLY-FRIENDLY REFRIGERANT WITH PURGE

FIELD

This disclosure relates generally to a heating, ventilation, air conditioning, and refrigeration (HVACR) system. More specifically, this disclosure relates to an HVACR system including a purge and utilizing environmentally-friendly refrigerants.

BACKGROUND

Refrigeration systems such as centrifugal chillers, utilize low pressure refrigerants such as CFC-11, CFC-113, HCFC-123 and multi-pressure refrigerants such as CFC-114 and HFC-245fa to operate at a low pressure, e.g., less than atmospheric pressure, either at all times or under a set of operating or stand-down conditions.

SUMMARY

This disclosure relates generally to a heating, ventilation, air conditioning, and refrigeration (HVACR) system. More specifically, this disclosure relates to an HVACR system including a purge and utilizing environmentally-friendly refrigerants.

A refrigeration system is disclosed. The refrigeration system includes a refrigeration circuit including a compressor, a condenser, an expansion valve, and an evaporator fluidly connected. A purge circuit is fluidly connected to the condenser. The purge circuit is configured to receive a purge stream from the condenser. The purge stream is a mixture including a refrigerant and non-condensables. The purge circuit includes a plurality of heat exchangers for condensing the purge stream such that the non-condensables and the refrigerant in the purge stream are separated.

A system for removing undesired materials from a refrigerant of a refrigeration system is disclosed. The system includes a purge circuit configured to receive a purge stream including the refrigerant and non-condensables. The purge circuit includes first and second heat exchangers fluidly connected and a purge valve fluidly connected to the second heat exchanger and configured to exhaust the non-condensables to the environment.

A method of removing non-condensables from a refrigerant is disclosed. The method includes condensing a purge stream that includes a mixture of refrigerant and non-condensables in a first heat exchanger and directing a gaseous portion of the purge stream from the condensing to a second heat exchanger. The gaseous portion of the purge stream from the condensing is further condensed in the second heat exchanger. A gaseous portion of the purge stream from the condensing in the second heat exchanger is exhausted to the environment.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

Figure 1:
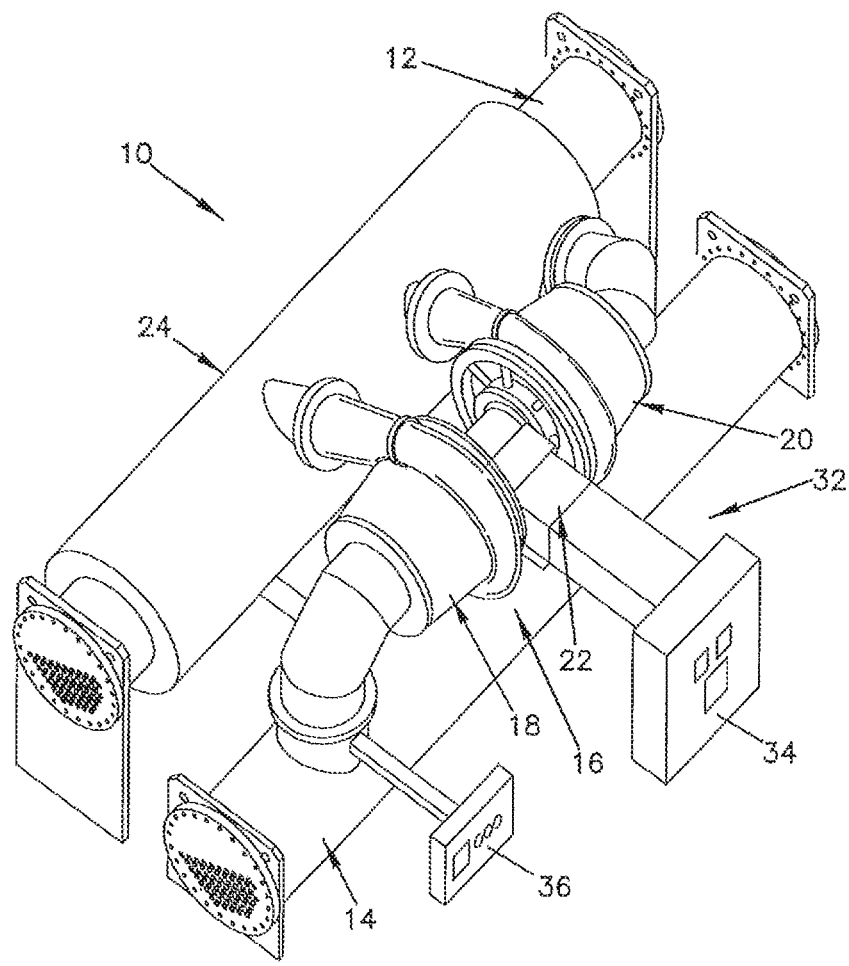
FIG. 1 is a perspective view of an HVACR system for implementing systems and methods described in this Specification, according to an embodiment.

This disclosure relates generally to a heating, ventilation, air conditioning, and refrigeration (HVACR) system. More specifically, this disclosure relates to an HVACR system including a purge and utilizing environmentally-friendly refrigerants.

A refrigerant is considered environmentally-friendly when it has a 100 year direct global warming potential (GWP) of less than 150 metric tons of carbon dioxide equivalent. GWP is a relative measure of how much heat a greenhouse gas traps in the atmosphere as compared to carbon dioxide as a reference. A GWP is calculated over a specific time interval, commonly 20, 100 or 500 years. GWP is expressed as a factor of carbon dioxide (whose GWP is standardized to 1). The higher GWP potential for a refrigerant results in great potential to contribute to global climate change.

Environmental impacts of refrigerants are a growing concern. For example, since 2011, the European Union has been phasing out refrigerants with a global warming potential (GWP) of more than, for example, 150 in some refrigeration systems. Environmentally-friendly refrigerants, with suitable properties such as density, vapor pressure, heat of vaporization, and suitable chemical properties, which satisfy the requirements regarding safety and environment impacts, such as the European Union Standard discussed above, can be utilized for refrigeration systems. The environmentally-friendly refrigerants are nonflammable or mildly flammable, non-ozone depleting, energy efficient, low in toxicity, compatible with materials of construction, and are chemically stable over the life of the equipment.

In some HVACR systems, such as, but not limited to, a chiller system, certain components, including the evaporator and, under certain conditions, the condenser, may operate at a pressure lower than the atmospheric pressure. Such HVACR systems can be referred to as a low pressure liquid chiller, a negative pressure liquid chiller, or the like, because the chiller system utilizes a refrigerant that operates at or below an environmental pressure. As a result of the lower than atmospheric portion of the operating map, it is possible for air, moisture, and other non-condensables to leak into the chiller system. The non-condensables can include, for example, air, water, and other non-condensables. The non-condensables can make their way into and become trapped in the condenser. As a result, the condensing pressure and compressor power requirements increase, thereby reducing chiller efficiency and cooling capacity.

Typically, to remove the non-condensables, a purge has been included in such chiller systems. Purges have been used to expel non-condensables such as, for example, moisture, air and other non-condensables, from refrigerant chillers while minimizing the loss of the environmentally-suitable refrigerant in the process of removing such non-condensables. The purges can be operatively independent of an operation status of the refrigerant.

However, purges generally include a separate and discrete hermetic refrigeration circuit which may employ a purge refrigerant different than the chiller system refrigerant. Such purge refrigerants can include, for example, a relatively high pressure refrigerant such as, for example, the refrigerant referred to as R-12, R-134a, R-410A, R-407A, R-407F, R-404, or the like. It will be appreciated that the refrigerant used in the purge 200 can be any suitable refrigerant that can create a lower evaporative temperature than the refrigerant. The refrigerants used in the purge may be a relatively less environmentally-friendly refrigerant than the chiller system refrigerant. Furthermore, inclusion of such an additional system (including a compressor and multiple heat exchangers) can increase a complexity of the chiller system.

Purges may also rely upon a material (e.g., carbon) to assist in removing the non-condensables from the refrigerant. However, in chiller systems utilizing environmentally-friendly refrigerants, the carbon material may be ineffective or even negatively impactful to the chiller system refrigerant.

The embodiments described may be applicable to any low pressure chiller. For example, the embodiments may be used with current refrigerants in a low pressure chiller. The embodiments described may also be used with new-age refrigerants, including environmentally-friendly refrigerants such as, but not limited to, R514A, R1233zd, or the like. It is to be appreciated that these refrigerants are examples and that any suitable refrigerant for a low pressure chiller may be utilized with the embodiments described.

An "expansion valve" may also be referred to as an expander or expansion device. In an embodiment, the expansion valve may be an expansion valve, expansion plate, expansion vessel, orifice, or the like, or other such types of expansion mechanisms. It is to be appreciated that the expansion valve may be any type of expander used in the field for expanding a working fluid to cause the working fluid to decrease in temperature.

FIG. 1 is a perspective view of an HVACR system 10 which can be implemented as a chiller or include a chiller for implementing systems and methods described in this Specification, according to an embodiment. The HVACR system 10 may include one or more additional features which are not illustrated for simplicity of the drawings.

The illustrated HVACR system 10 includes a condenser 12, an evaporator 14, a multi-stage compressor 16 having a first stage compressor 18 and a second stage compressor 20 that can be driven by any suitable electric motor 22. It will be appreciated that the compressor 16 can be a single stage compressor, according to an embodiment. The HVACR system 10 can also include an economizer 24, which may be coaxial with the condenser 12. It will be appreciated that the HVACR system 10 can include one or more additional features such as, but not limited to, one or more flow control valves, a lubricant separator, a heat sink, a pump, or the like.

A variable speed drive (VSD) system 32 includes electric motor 22. The compressor 16 can be driven by electric motor 22. The electric motor 22 may be located, for example, between the first stage compressor 18, the second stage compressor 20, and a VSD 34 including power electronics. The VSD 34 may alternatively be referred to as the variable frequency drive (VFD) 34. The electric motor 22 can include a direct drive, variable speed, hermetic motor, according to an embodiment. A speed of the electric motor 22 can be controlled by varying a frequency of the electric power that is supplied to the electric motor 22 by the VFD 34. The VFD 34 can include, for example, an electrical power converter including a line rectifier and line electrical current harmonic reducer, power circuits, and control circuits (such circuits including all communication and control logic, including electronic power switching circuits). The VFD 34 can respond, for example, to signals received from a microprocessor integrated within a control panel 36 to increase and/or decrease the speed of the electric motor 22 by changing the frequency of the current supplied to the electric motor 22. The speed of the electric motor 22 can be varied, for example, to meet changing system requirements.

According to an embodiment, operation of the first and second stage compressors 18, 20, and the HVACR system 10, can be controlled by, for example, the control panel 36 in connection with sensors located within the HVACR system 10 that allow for the reliable operation of the HVACR system 10. Other controls may be linked to the control panel 36, such as, but not limited to, compressor controls; system supervisory controls that can be coupled with other controls to improve efficiency; soft motor starter controls; controls for regulating guide vanes and/or controls to avoid system fluid surge; control circuitry for the electric motor 22 and/or VFD 34; and other sensors/controls are contemplated as should be understood. It should be apparent that software may be provided in connection with operation of the VFD 34 and other components of the HVACR system 10, for example.

It will be appreciated that the HVACR system 10 can include one or more additional components. For example, the HVACR system 10 can include a purge circuit or the like.

Figure 2:
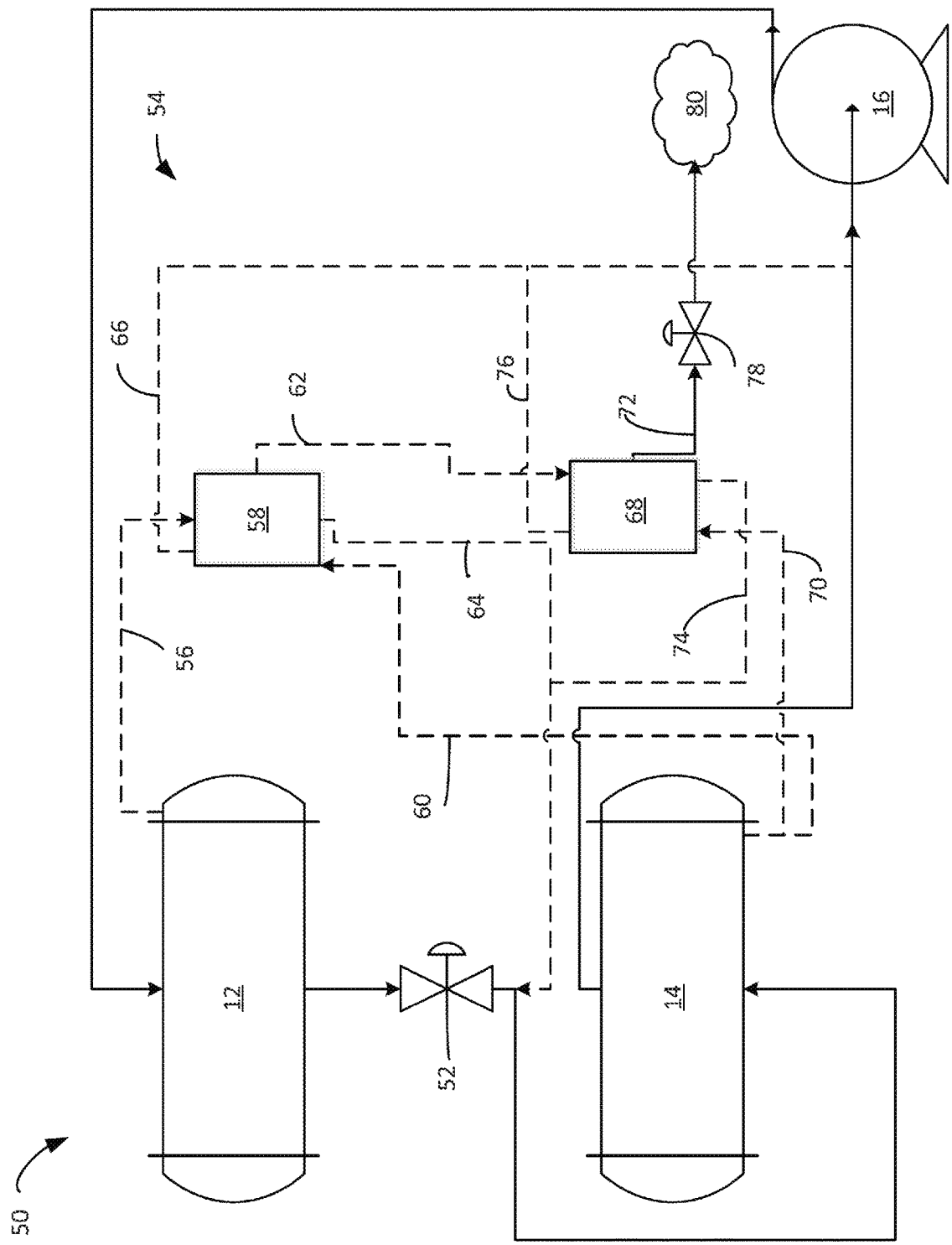
FIG. 2 is a schematic diagram of a refrigerant circuit and purge circuit, according to an embodiment.

FIG. 2 is a schematic diagram of a refrigerant circuit 50 and a purge circuit 54, according to an embodiment. The refrigerant circuit 50 generally includes the compressor 16, the condenser 12, an expansion valve 52, and an evaporator 14 fluidly connected to form a closed fluid circuit. The compressor 16 can be, for example, a centrifugal compressor as shown in FIG. 1. In an embodiment, the compressor 16 can alternatively be a screw compressor, other compressor type suitable for use with a chiller, or the like.

The refrigerant circuit 50 is exemplary and can be modified to include additional components. For example, in some embodiments the refrigerant circuit 50 can include one or more flow controllers (e.g., valves or the like), a receiver tank, a dryer, a suction-liquid heat exchanger, or the like.

The refrigerant circuit 50 can generally be applied in a variety of systems used to control an environmental condition (e.g., temperature, humidity, air quality, or the like) in a space (generally referred to as a conditioned space). Examples of systems include, but are not limited to, heating, ventilation, air conditioning, and refrigeration (HVACR) systems or the like.

The components of the refrigerant circuit 50 are fluidly connected. The refrigerant circuit 50 can be specifically configured to be a cooling system (e.g., an air conditioning system) capable of operating in a cooling mode. Alternatively, the refrigerant circuit 50 can be specifically configured to be a heat pump system which can operate in both a cooling mode and a heating/defrost mode.

The refrigerant circuit 50 can be configured to heat or cool a process fluid (e.g., a heat transfer fluid or medium (e.g., a liquid such as, but not limited to, water or the like)), and thus the refrigerant circuit 50 may be generally referred to as a liquid chiller system or simply a chiller system.

In operation, the compressor 16 compresses a refrigerant from a relatively lower pressure gas to a relatively higher-pressure gas. The relatively higher-pressure and higher temperature gas is discharged from the compressor 16 and flows through the condenser 12. In accordance with generally known principles, the refrigerant flows through the condenser 12 and rejects heat to a process fluid, thereby cooling the refrigerant. The cooled refrigerant, which is now in a liquid form, flows to the expansion valve 52. The expansion valve 52 reduces the pressure of the refrigerant. As a result, a portion of the refrigerant is converted to a gaseous form. The refrigerant, which is now in a mixed liquid and gaseous form flows to the evaporator 14.

The refrigerant flows through the evaporator 14 and absorbs heat from a process fluid, heating the refrigerant, and converting it to a gaseous form. The gaseous refrigerant then returns to the compressor 16. The above-described process continues while the refrigerant circuit 50 is operating, for example, in a cooling mode (e.g., while the compressor 16 is enabled).

Because certain components, including the evaporator 14 and, under certain conditions, the condenser 12 of the refrigerant circuit 50 operate at a pressure lower than the atmospheric pressure, it is possible for air, moisture, and other non-condensables to leak into the refrigerant circuit 50. The non-condensables can include, for example, air, water, and other non-condensables. The non-condensables can make their way into and become trapped in the condenser 12. As a result, the condensing pressure and compressor power requirements increase thereby reducing chiller efficiency and cooling capacity.

In order to remove the non-condensables from the refrigerant, the purge circuit 54 is employed.

The purge circuit 54 generally includes a plurality of heat exchangers 58, 68 via which a purge stream (e.g., mixture including the refrigerant and non-condensables) from the condenser 12 is placed into a heat exchange relationship with refrigerant from the evaporator 14 to condense the refrigerant portion of the purge stream, thereby separating at least a portion of the refrigerant in the purge stream from the non-condensables in the purge stream.

In the illustrated embodiment, a portion of the purge stream having been condensed in the first heat exchanger 58 is provided to the second heat exchanger 68, where the portion of the purge stream having been condensed in the first heat exchanger 58 is in a heat exchange relationship with refrigerant from the evaporator 14 so that additional refrigerant is condensed from the purge stream and non-condensables (e.g., air or the like) can be exhausted to environment 80.

It is to be appreciated that in an embodiment, a single heat exchanger may be sufficient (such as a single heat exchanger including a thermo-electric cooler). In an embodiment, more than two heat exchangers can be utilized. Prior to being released to the environment 80, an amount of refrigerant remaining in the purge stream being exhausted should be at or about 1 pound refrigerant per pound of air or less.

The purge circuit 54 will now be discussed in further detail. A purge stream (e.g., a mixture including chiller system refrigerant and non-condensables) can be directed from the condenser 12 toward the purge circuit 54 via a refrigerant line 56 (e.g., pipe, conduit, or the like).

The purge stream is provided to the heat exchanger 58. At the heat exchanger 58, the purge stream is placed in a heat exchange relationship with refrigerant from the evaporator 14 via refrigerant line 60. The refrigerant from the evaporator 14 is returned to a suction inlet of the compressor 16 via refrigerant line 66. A liquid portion of the purge stream that is condensed from the heat exchange at heat exchanger 58 is returned to the refrigerant circuit 50 via refrigerant line 64 to a location that is downstream of the expansion valve 52 and upstream of the evaporator 14. A gaseous portion of the purge stream (including the non-condensables and refrigerant) is provided to the second heat exchanger 68 via refrigerant line 62.

At the heat exchanger 68, the purge stream is in a heat exchange relationship with refrigerant from the evaporator 14 via refrigerant line 70. In an embodiment, the heat exchanger 68 can be a thermo-electric cooler or the like. An amount of cooling beyond that provided by the refrigerant from the evaporator 14 can be adjusted by powering the thermo-electric cooler, thereby further reducing the temperature of the purge stream, and condensing additional refrigerant. Refrigerant from the evaporator 14 is returned to the refrigerant circuit 50 via refrigerant line 76 to the suction inlet of the compressor 16. Liquid condensed from the purge stream is collected and returned to a location that is downstream of the expansion valve 52 and upstream of the evaporator 14 via refrigerant line 74. The remaining gaseous portion of the purge stream is exhausted to environment 80 via refrigerant line 72 when the purge valve 78 is opened. The purge valve 78 can be controlled to regulate flow of the non-condensables leaving the heat exchanger 68. The purge valve 78 can be controlled to maintain a pressure in the purge stream and the purge circuit 54 to keep the pressure at or near a condensing pressure in the condenser 12. In an embodiment, the purge valve 78 can be, for example, a back-pressure regulating valve, an electronic valve based on a pressure measurement, or the like. For example, when a pressure on the purge valve 78 is greater than a threshold amount, the purge valve 78 may enable flow to the environment 80.

In an embodiment, a sensor which can report a chemical composition (concentration of refrigerant specifically) in the non-condensable stream provided to the environment 80. In an embodiment, the sensor could be used to regulate power to the heat exchanger 68 to ensure the concentration setpoint (which can be determined by the user) is met. In another embodiment, the composition of the non-condensable stream can be inferred from the temperature and pressure of the purge stream in the heat exchanger 68, based on the thermodynamics of the refrigerant. In such an embodiment, the user can set the temperature of the thermoelectric cooler based on the desired composition.

There may be other methods or measuring or estimating/inferring the composition of the exit stream to ensure sufficient removal of the refrigerant from the non-condensable stream prior to exhausting to the environment 80.

The illustrated embodiment does not utilize a secondary compressor for the purge circuit 54. As a result, the purge circuit 54 can be utilized to remove non-condensables from the refrigerant while reducing a number of moving parts needed, thereby increasing a reliability of the system. The illustrated embodiment also does not utilize additional refrigerants (which typically have relatively high GWPs).

The illustrated embodiment is an example. It is to be appreciated that the heat exchangers 58, 68 could, for example, be placed inside the evaporator 14 to facilitate heat exchange with refrigerant and avoid the cost of additional piping and shells for the heat exchangers 58, 68.

Figure 3:
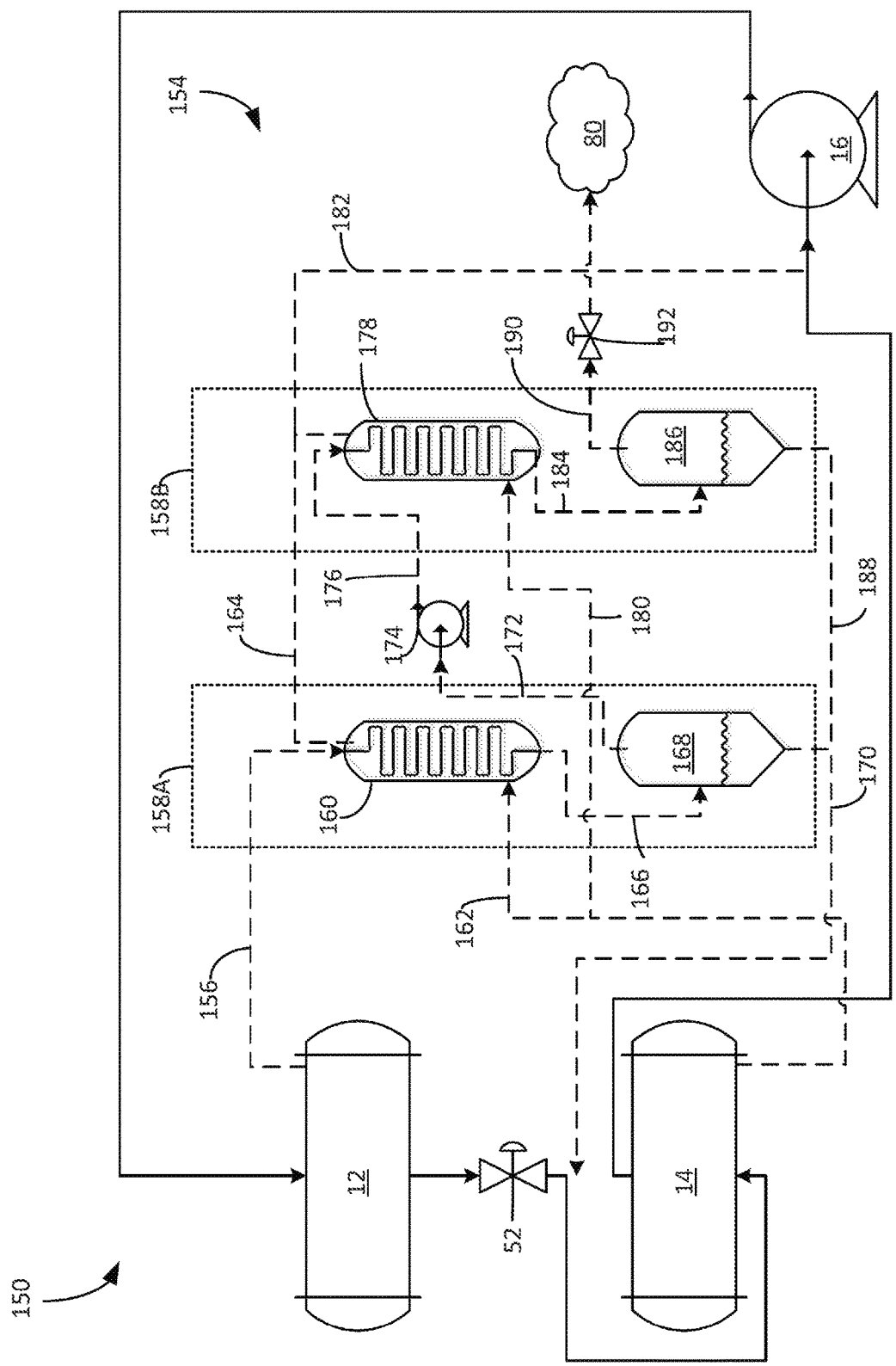
FIG. 3 is a schematic diagram of a refrigerant circuit and purge circuit, according to an embodiment.

FIG. 3 is a schematic diagram of a refrigerant circuit 150 and a purge circuit 154, according to an embodiment. The refrigerant circuit 150 can include similar features as the refrigerant circuit 50. The refrigerant circuit 150 and purge circuit 154 may be a general representation of an alternative embodiment to the refrigerant circuit 50 and purge circuit 54 in FIG. 2. In an embodiment, the purge circuit 54 and the purge circuit 154 can be combined to work together.

The refrigerant circuit 150 generally includes the compressor 16, the condenser 12, the expansion valve 52, and the evaporator 14. The compressor 16 can be, for example, a centrifugal compressor as shown in FIG. 1. In an embodiment, the compressor 16 can alternatively be a screw compressor, other compressor type suitable for use with a chiller, or the like.

The refrigerant circuit 150 is exemplary and can be modified to include additional components. For example, in some embodiments the refrigerant circuit 150 can include one or more flow controllers, a receiver tank, a dryer, a suction-liquid heat exchanger, or the like.

The refrigerant circuit 150 can generally be applied in a variety of systems used to control an environmental condition (e.g., temperature, humidity, air quality, or the like) in a space (generally referred to as a conditioned space). Examples of systems include, but are not limited to, heating, ventilation, air conditioning, and refrigeration (HVACR) systems or the like.

The components of the refrigerant circuit 150 are fluidly connected. The refrigerant circuit 150 can be specifically configured to be a cooling system (e.g., an air conditioning system) capable of operating in a cooling mode. Alternatively, the refrigerant circuit 150 can be specifically configured to be a heat pump system which can operate in both a cooling mode and a heating/defrost mode.

The refrigerant circuit 150 can be configured to heat or cool heat transfer fluid or medium (e.g., a liquid such as, but not limited to, water or the like), and thus the refrigerant circuit 150 may be generally referred to as a liquid chiller system.

In operation, the compressor 16 compresses a refrigerant from a relatively lower pressure gas to a relatively higher-pressure gas. The relatively higher-pressure and higher temperature gas is discharged from the compressor 16 and flows through the condenser 12. In accordance with generally known principles, the refrigerant flows through the condenser 12 and rejects heat to a heat transfer fluid or medium (e.g., water, air, etc.), thereby cooling the refrigerant. The cooled refrigerant, which is now in a liquid form, flows to the expansion valve 52. The expansion valve 52 reduces the pressure of the refrigerant. As a result, a portion of the refrigerant is converted to a gaseous form. The refrigerant, which is now in a mixed liquid and gaseous form flows to the evaporator 14.

The refrigerant flows through the evaporator 14 and absorbs heat from a heat transfer medium (e.g., water, air, etc.), heating the refrigerant, and converting it to a gaseous form. The gaseous refrigerant then returns to the compressor 16. The above-described process continues while the refrigerant circuit 150 is operating, for example, in a cooling mode (e.g., while the compressor 16 is enabled).

Because certain components, including the evaporator 14 and, under certain conditions, the condenser 12 of the refrigerant circuit 150 operate at a pressure lower than the atmospheric pressure, it is possible for air, moisture, and other non-condensables to leak into the refrigerant circuit 150. The non-condensables can include, for example, air, water, and other non-condensables. The non-condensables can make their way into and become trapped in the condenser 12. As a result, the condensing pressure and compressor power requirements increase thereby reducing chiller efficiency and cooling capacity.

In order to remove the non-condensables from the refrigerant, the purge circuit 154 is employed.

The purge circuit 154 includes a plurality of heat exchange stages 158A, 158B in which a purge stream (e.g., refrigerant including non-condensables) from the condenser 12 is placed into a heat exchange relationship with refrigerant from the evaporator 14 to condense the refrigerant portion in the purge stream, thereby separating at least a portion of the non-condensables in the purge stream from the refrigerant in the purge stream.

In the illustrated embodiment, a portion of the purge stream collects in a separator 168 and a gaseous portion is provided to a purge compressor 174 where it is compressed and provided to the heat exchange stage 158B. In heat exchange stage 158B the purge stream is again condensed and a gaseous portion (e.g., air) is exhausted to the environment 80. It is to be appreciated that in an embodiment, more than two heat exchange stages 158A, 158B can be included. In an embodiment, a third (or more) stage can be selectively enabled/disabled to control an overall purity of the non-condensable exit stream.

The purge circuit 154 will now be discussed in further detail. Refrigerant from the condenser 12 (which is primarily in a gaseous form and includes non-condensables) can be provided to the purge circuit 154 as a purge stream via refrigerant line 156. The purge stream is provided to a heat exchanger 160. Refrigerant from the evaporator 14 is received via refrigerant line 162 so that the heat exchanger 160 places the purge stream and refrigerant from the evaporator 14 in a heat exchange relationship in the heat exchanger 160. The purge stream is discharged to a separator tank 168 via refrigerant line 166.

In the separator 168, a gaseous portion of the purge stream is discharged to purge compressor 174 via refrigerant line 172. A liquid portion of the purge stream is returned to the main refrigerant circuit via refrigerant line 170 at a location that is downstream of the expansion valve 52 and upstream of the evaporator 14. The refrigerant from the evaporator 14 is returned from the heat exchanger 160 to the suction side of the compressor 16 via refrigerant line 164.

The purge compressor 174 compresses the purge stream and discharges the compressed purge stream at a relatively higher pressure and temperature to the heat exchanger 178 via refrigerant line 176. The purge compressor 174 can be, for example, a rotary compressor, a reciprocating compressor, a scroll compressor, or the like. In an embodiment, the purge compressor 174 may have a relatively small volume flow rate. Modifying a compression ratio of the purge compressor 174 can, for example, modify the amount of non-condensables being removed from the purge stream (e.g., due to an increase in amount of refrigerant being condensed from the non-condensables). For example, increasing the compression ratio can result in an increase in the removal of the non-condensables. In an embodiment, a higher pressure can result in an increased condensing of the refrigerant, and thus a lower percentage of refrigerant mixed with the non-condensables.

In the heat exchanger 178, the purge stream is again condensed by refrigerant from the evaporator 14 received via refrigerant line 180. Via refrigerant line 184, the purge stream is discharged into a separator 186, where the liquid portion is returned to the main refrigerant circuit via the refrigerant line 188 at a location that is between the expansion valve 52 and the evaporator 14. The gaseous portion (which contains non-condensables and a refrigerant amount that is less than 1 pound refrigerant per pound of air) is discharged to the environment 80 via line 190. A valve 192 can control when the purge stream is exhausted to the environment 80. The refrigerant from the evaporator 14 is returned to the suction line of the compressor 16 via the line 182.

The valve 192 can be controlled based on a pressure so that when a particular pressure is identified, the non-condensables are exhausted to the environment 80. Purge release valve vents depleted purge gas to the atmosphere, while the gas compressor and purge release valve together maintain the required pressure in the second condensation stage 158B.

The illustrated embodiment is an example. It is to be appreciated that the heat exchangers 160, 178 could, for example, be placed inside the evaporator 14 to facilitate heat exchange with refrigerant and avoid the cost of additional piping and shells for the heat exchangers 160, 178.

Aspects

It is noted that any of aspects 1-10 can be combined with any one of aspects 11-16 or 17-20. Any one of aspects 11-16 can be combined with any one of aspects 17-20.

Aspect 1. A refrigeration system, comprising: a refrigeration circuit, comprising: a compressor, a condenser, an expansion valve, and an evaporator fluidly connected; and a purge circuit fluidly connected to the condenser, the purge circuit configured to receive a purge stream from the condenser, the purge stream being a mixture including a refrigerant and non-condensables; wherein the purge circuit includes a plurality of heat exchangers for condensing the purge stream such that the non-condensables and the refrigerant in the purge stream are separated.

Aspect 2. The refrigeration system of aspect 1, wherein at least one of the plurality of heat exchangers in the purge circuit is a thermo-electric cooler.

Aspect 3. The refrigeration system of one of aspects 1 or 2, wherein the purge circuit includes a purge compressor disposed fluidly between a first of the plurality of heat exchangers and a second of the plurality of heat exchangers such that the purge stream exiting the first of the plurality of heat exchangers is compressed and then provided to the second of the plurality of heat exchangers.

Aspect 4. The refrigeration system of any one of aspects 1-3, wherein each of the plurality of heat exchangers places the purge stream and the refrigerant provided from the evaporator in a heat exchange relationship.

Aspect 5. The refrigeration system of any one of aspects 1-4, further comprising a plurality of separator tanks.

Aspect 6. The refrigeration system of any one of aspects 1-5, wherein the plurality of heat exchangers are arranged physically separately from the evaporator.

Aspect 7. The refrigeration system of any one of aspects 1-6, wherein the purge circuit includes a purge valve configured to selectively exhaust the purge stream to the environment.

Aspect 8. The refrigeration system of aspect 7, wherein the purge valve is configured to selectively exhaust the purge stream to the environment when a pressure of the purge stream exceeds a threshold.

Aspect 9. The refrigeration system of any one of aspects 1-8, wherein the refrigerant is an environmentally-friendly refrigerant.

Aspect 10. The refrigeration system of any one of aspects 1-9, wherein the refrigerant is returned to a location of the refrigerant circuit fluidly between the expansion valve and the evaporator.

Aspect 11. A system for removing undesired materials from a refrigerant of a refrigeration system, comprising: a purge circuit configured to receive a purge stream including the refrigerant and non-condensables, comprising: first and second heat exchangers fluidly connected; a purge valve fluidly connected to the second heat exchanger and configured to exhaust the non-condensables to the environment.

Aspect 12. The system of aspect 11, wherein the second heat exchanger is a thermo-electric cooler.

Aspect 13. The system of one of aspects 11 or 12, wherein the purge circuit includes a purge compressor disposed fluidly between the first heat exchanger and the second heat exchanger such that the purge stream exiting the first heat exchanger is compressed and then provided to the second heat exchanger.

Aspect 14. The system of any one of aspects 11-13, wherein the first and second heat exchangers place the purge stream and a refrigerant received from an evaporator in a heat exchange relationship.

Aspect 15. The system of any one of aspects 11-14, wherein the purge circuit further comprises a plurality of separator tanks.

Aspect 16. The system of any one of aspects 11-15, wherein the refrigerant is an environmentally-friendly refrigerant.

Aspect 17. A method of removing non-condensables from a refrigerant, the method comprising: condensing a purge stream that includes a mixture of refrigerant and non-condensables in a first heat exchanger; directing a gaseous portion of the purge stream from the condensing to a second heat exchanger; condensing the gaseous portion of the purge stream from the condensing in the second heat exchanger; and exhausting a gaseous portion of the purge stream from the condensing in the second heat exchanger to the environment.

Aspect 18. The method of aspect 17, further comprising compressing the gaseous portion of the purge stream from the condensing in the first heat exchanger before the condensing the gaseous portion of the purge stream from the condensing in the second heat exchanger.

Aspect 19. The method of one of aspects 17 or 18, further comprising returning a liquid portion of the purge stream from the condensing in the first heat exchanger and the second heat exchanger to an evaporator.

Aspect 20. The method of any one of aspects 17-19, wherein the condensing the purge stream in the second heat exchanger includes a thermo-electric cooler as the second heat exchanger.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A refrigeration system, comprising:
   a refrigeration circuit, comprising:
      a compressor, a condenser, an expansion valve, and an evaporator fluidly connected; and
   a purge circuit fluidly connected to the condenser, the purge circuit configured to receive a purge stream from the condenser, the purge stream being a mixture including a refrigerant and non-condensables;
   wherein the purge circuit includes a plurality of heat exchangers in series for condensing the purge stream such that the non-condensables and the refrigerant in the purge stream are separated, at least one of the plurality of heat exchangers places the purge stream and refrigerant provided from the evaporator in a heat exchange relationship, the refrigerant provided from the evaporator being returned from the at least one of the plurality of heat exchangers to a suction line of the compressor, and the purge circuit configured to exhaust the non-condensables separated from the refrigerant to the environment in gaseous form.

2. The refrigeration system of claim 1, wherein at least one of the plurality of heat exchangers in the purge circuit is a thermo-electric cooler.

3. The refrigeration system of claim 1, wherein the purge circuit includes a purge compressor disposed fluidly between a first of the plurality of heat exchangers and a second of the plurality of heat exchangers such that the purge stream exiting the first of the plurality of heat exchangers is compressed and then provided to the second of the plurality of heat exchangers.

4. The refrigeration system of claim 1, wherein each of the plurality of heat exchangers places the purge stream and the refrigerant provided from the evaporator in a heat exchange relationship.

5. The refrigeration system of claim 1, further comprising a plurality of separator tanks, the purge circuit passing the non-condensables through the plurality of heat exchangers and the plurality of separator tanks in series.

6. The refrigeration system of claim 1, wherein the plurality of heat exchangers are arranged physically separately from the evaporator.

7. The refrigeration system of claim 1, wherein the purge circuit includes a purge valve configured to selectively exhaust the purge stream to the environment.

8. The refrigeration system of claim 7, wherein the purge valve is configured to selectively exhaust the purge stream to the environment when a pressure of the purge stream exceeds a threshold.

9. The refrigeration system of claim 1, wherein the refrigerant is an environmentally-friendly refrigerant.

10. The refrigeration system of claim 1, wherein the refrigerant separated from the purge stream is liquid and returned to a location of the refrigerant circuit fluidly between the expansion valve and the evaporator.

11. A system for removing undesired materials from a refrigerant of a refrigeration system that includes a refrigerant circuit with a compressor, a condenser, an expansion valve, and an evaporator fluidly connected, comprising:
a purge circuit configured to receive a purge stream including the refrigerant and non-condensables, comprising:
first and second heat exchangers fluidly connected in series, at least one of the first and second heat exchangers placing the purge stream and refrigerant provided from the evaporator in a heat exchange relationship, the refrigerant provided from the evaporator being returned from the at least one of the first and second heat exchangers to a suction line of the compressor, and a purge valve fluidly connected to the second heat exchanger and configured to exhaust the non-condensables to the environment in gaseous form.

12. The system of claim 11, wherein the second heat exchanger is a thermo-electric cooler.

13. The system of claim 11, wherein the purge circuit includes a purge compressor disposed fluidly between the first heat exchanger and the second heat exchanger such that the purge stream exiting the first heat exchanger is compressed and then provided to the second heat exchanger.

14. The system of claim 11, wherein each of the first and second heat exchangers place the purge stream and the refrigerant provided from the evaporator in a heat exchange relationship.

15. The system of claim 11, wherein the purge circuit further comprises a plurality of separator tanks, the purge circuit passing the non-condensables through the first and second heat exchangers and the plurality of separator tanks in series.

16. The system of claim 11, wherein the refrigerant is an environmentally-friendly refrigerant.

17. A method of removing non-condensables from a refrigerant, the method comprising:
condensing a purge stream that includes a mixture of refrigerant and non-condensables in a first heat exchanger;
directing a gaseous portion of the purge stream from the condensing to a second heat exchanger;
condensing the gaseous portion of the purge stream from the condensing in the second heat exchanger, wherein at least one of the condensing the purge stream in the first heat exchanger and the condensing of the gaseous portion of the purge stream in the second heat exchanger places the purge stream and refrigerant provided from the evaporator in a heat exchange relationship, the refrigerant provided from the evaporator being returned from the at least one of the first heat exchanger and the second heat exchanger to a suction line of the compressor; and
exhausting a gaseous portion of the purge stream from the condensing in the second heat exchanger to the environment, the gaseous portion of the purge stream exhausted to the environment.

18. The method of claim 17, further comprising compressing the gaseous portion of the purge stream from the condensing in the first heat exchanger before the condensing the gaseous portion of the purge stream from the condensing in the second heat exchanger.

19. The method of claim 17, further comprising returning a liquid portion of the purge stream from the condensing in the first heat exchanger and the second heat exchanger to the evaporator.

20. The method of claim 17, wherein the condensing the purge stream in the second heat exchanger includes a thermo-electric cooler as the second heat exchanger.

* * * * *